Patented Dec. 1, 1942

2,303,982

UNITED STATES PATENT OFFICE 2,303,982

ADHESIVE

Alfred Brookes, London, England, assignor, by mesne assignments, to American Cyanamid Company, New York, N. Y., a corporation of Maine No Drawing. Application June 23, 1941, Serial No. 399,402. In Great Britain November 6, 1939

8 Claims. (Cl. 260—9)

This invention relates to the manufacture of an improved adhesive based on synthetic resins of the urea-formaldehyde type.

Normally urea resin adhesives comprise moderately viscous aqueous solutions of the resin with or without the addition of extenders such for example as rye-flour, wood flour, starch. These adhesives are very suitable for the glueing of plywood, veneers, etc. and in any constructional purposes where the surfaces to be joined can be brought into close and accurate contact first by exact machining and then by the application of sufficient pressure. In the absence of these conditions, as may be the case with ill-fitting parts or insufficient pressure, poor joints may result from either of two causes.

Owing to the fluidity of the adhesive it may exude or flow from the joint leaving voids. On the other hand, even if the adhesive is retained an excessively thick glue layer results. A common feature of adhesives of this type is that after the initial setting has taken place there is an appreciable shrinkage of the resin and in excessively thick layers this results in the glue cracking into fragments causing weakening of the joint with age.

The addition of fillers to urea resins, including adhesives, has frequently been proposed. Fillers will serve to reduce fluidity, so that the first difficulty is overcome, but hitherto no filler for the aqueous adhesives has been found by the addition of which subsequent cracking of the resin is eliminated while still leaving unimpaired the desirable properties of the glue, such as ease of working, stability in storage, speed of setting and resistance to water.

According to this invention a glue which is relatively free from cracking, which has its desirable properties unimpaired and gives sound joints when used for joinery and ordinary constructional work, is obtained from aqueous urea resin adhesives by incorporating comminuted cellulosic fillers (powdered cotton, wood flour, disintegrated sulphite or kraft pulps and the like) which have previously been impregnated with benzyl alcohol.

Joints made with such a glue mixture remain strong and the glue layer remains substantially free from cracking even when the thickness is considerable, say up to one-sixteenth of an inch.

The amount of filler to be added and the proportion of benzyl alcohol to the cellulosic material may be varied. In general the optimum proportions are dependent on the amount of water contained in the aqueous glue but may readily be determined by experiment. Cracking is diminished with increased proportions of the filler and there is used at least 10% of treated filler calculated on the weight of aqueous glue. The proportion of benzyl alcohol employed is in general not less than an equal weight to the weight of cellulosic material, a preferred proportion being 2 parts by weight of benzyl alcohol to 1 part of cellulosic material.

Setting of the improved glue is brought about in the known manner by the use of hardening agents which may be mixed into the glue immediately prior to use or may be separately applied to the work, e. g. to one of the surfaces to be joined with the glue applied to the opposing surface.

Although the improved glue is primarily intended for cold-setting work it can with advantage be used in hot presses. In common with the ordinary urea resin adhesives setting of the glue in conjunction with a hardening agent is accelerated by heat.

The following examples illustrate the invention, the parts being by weight:

Example 1

10 parts of soft wood flour (80–120 mesh) are impregnated in a kneading machine with 20 parts of benzyl alcohol and 100 parts of an aqueous urea resin glue (such as that known commercially as Kaurit Glue W or Beetle Cement W) are mixed in. A viscous glue well adapted to brushing or to applying in relatively thick layers by spatula is obtained. In constructional work the glue is mixed prior to use with 1% of its weight of ammonium chloride and the mixture spread on the surfaces to be joined. The work is then clamped together under light pressure for about 3 hours at ordinary temperature when setting of the joint is effected.

Example 2

15 parts of hard wood flour (e. g. hickory or beech 80–100 mesh) are impregnated with 25 parts benzyl alcohol and 100 parts of Kaurit Glue W or Beetle Cement W are mixed in. The resultant glue has a similar consistency to that obtained in Example 1 but still gives good adhesion when applied in even thicker layers. Prior to use the glue is mixed with a hardening agent as described in the previous example. Alternatively a solution of ammonium chloride may be applied to one surface and allowed to dry. The glue is applied to the opposing surface and the two surfaces then brought together and held under pressure for about 3 hours until the joint has hardened.

Example 3

A neutral solution of 100 parts of urea in 270 parts of 40% formalin is boiled and while still boiling is adjusted to pH 6.0 by means of formic acid. The solution is boiled under reflux for 1½–2 hours until a sample remains clear on cooling rapidly to 20° C. It is then neutralised with caustic soda and evaporated to yield 215 parts by weight of a viscous resin. 200 parts of this resin are then kneaded with 10 parts of cotton flock which have previously been impregnated with 20 parts of benzyl alcohol by heating together. The glue is used in conjunction with a hardening agent as described in Examples 1 and 2.

What I claim is:

1. An adhesive comprising an aqueous urea-formaldehyde resin adhesive with which is incorporated a comminuted cellulosic filler previously impregnated with benzyl alcohol.

2. An adhesive as claimed in claim 1 in which there is employed not less than an equal weight of benzyl alcohol to the cellulose and at least ten per cent by weight of cellulose filler impregnated with benzyl alcohol calculated on the weight of the aqueous urea-formaldehyde resin.

3. An adhesive as claimed in claim 1 mixed with a hardening accelerator for the urea-formaldehyde resin.

4. An adhesive as claimed in claim 1 mixed with ammonium chloride.

5. An adhesive comprising 100 parts by weight of aqueous urea-formaldehyde resin adhesive and 5 to 20 parts by weight of cellulosic filler previously impregnated with 10 to 30 parts by weight of benzyl alcohol.

6. An adhesive comprising 10 parts by weight of soft wood flour impregnated with 20 parts by weight of benzyl alcohol and subsequently mixed with 100 parts by weight of aqueous urea-formaldehyde resin adhesive.

7. An adhesive comprising 15 parts by weight of hard wood flour impregnated with 25 parts by weight of benzyl alcohol and subsequently mixed with 100 parts by weight of aqueous urea-formaldehyde resin adhesive.

8. An adhesive comprising 10 parts by weight of cotton flock impregnated with 20 parts by weight of benzyl alcohol and subsequently mixed with 200 parts by weight of aqueous urea-formaldehyde resin adhesive.

ALFRED BROOKES.